US 6,570,353 B2

United States Patent
Krotsch et al.

(10) Patent No.: US 6,570,353 B2
(45) Date of Patent: May 27, 2003

(54) SYSTEM FOR THE ELECTRONIC COMMUTATION OF A BRUSHLESS DC MOTOR

(75) Inventors: Jens Krotsch, Niederstetten (DE); Thomas Kilian, Schontal (DE)

(73) Assignee: ebm Werke GmbH & Co. KG, Mulfingen (DE)

( * ) Notice: Subject to any disclaimer, the term of this patent is extended or adjusted under 35 U.S.C. 154(b) by 0 days.

(21) Appl. No.: 09/853,383

(22) Filed: May 11, 2001

(65) Prior Publication Data

US 2002/0014870 A1 Feb. 7, 2002

(30) Foreign Application Priority Data

May 12, 2000 (DE) .......................................... 100 23 370

(51) Int. Cl.⁷ ............................... H02P 6/10; H02P 6/18
(52) U.S. Cl. ...................... 318/439; 318/254; 318/721; 318/722
(58) Field of Search ................................. 318/138, 254, 318/439, 700, 720, 721, 722, 724

(56) References Cited

U.S. PATENT DOCUMENTS

| | | | | |
|---|---|---|---|---|
| 3,621,358 A | * | 11/1971 | Hinrichs et al. ............. | 318/138 |
| 4,752,724 A | | 6/1988 | Radziwill et al. | |
| 4,758,768 A | * | 7/1988 | Hendricks et al. .......... | 318/254 |
| 4,978,895 A | | 12/1990 | Schwarz | |
| 5,012,167 A | * | 4/1991 | Hendricks .................... | 318/254 |
| 5,374,880 A | * | 12/1994 | Kondoh et al. .............. | 318/254 |
| 5,491,393 A | | 2/1996 | Uesugi | |
| 5,663,618 A | | 9/1997 | Adachi et al. | |
| 5,757,152 A | | 5/1998 | Yuem | |
| 5,801,500 A | * | 9/1998 | Jensen et al. ................ | 318/254 |
| 5,835,992 A | | 11/1998 | Choi et al. | |

FOREIGN PATENT DOCUMENTS

| | | |
|---|---|---|
| DE | 33 06 642 | 9/1984 |
| DE | 36 02 227 | 7/1987 |
| DE | 39 34 139 | 4/1990 |
| DE | 195 24 557 | 1/1997 |
| EP | 0 621 681 | 10/1994 |
| EP | 0 872 948 | 10/1998 |
| EP | 0 881 761 | 12/1998 |

* cited by examiner

Primary Examiner—Bentsu Ro
(74) Attorney, Agent, or Firm—Kilpatrick Stockton, LLP

(57) ABSTRACT

The invention relates to a system for the electronic commutation of a brushless DC motor (1) having three phase windings (u, v, w) which are electrically displaced by 120°, comprising a semiconductor bridge (4) consisting of six power semiconductors ($S_1$ to $S_6$), which drives the phase windings (u, v, w) for generating a rotating magnetic stator field, a control unit (6) which correspondingly drives the power semiconductors ($S_1$ to $S_6$), and a device for detecting the respective rotational position of a rotor exhibiting a permanent-magnetic magnet wheel, the device for detecting the rotor position being constructed as sensor-less evaluating unit (8), for evaluating the voltage induced by the rotating magnet wheel which can be measured at the winding terminal (U, V, W) of the motor which is not currently driven.

Figure 1:
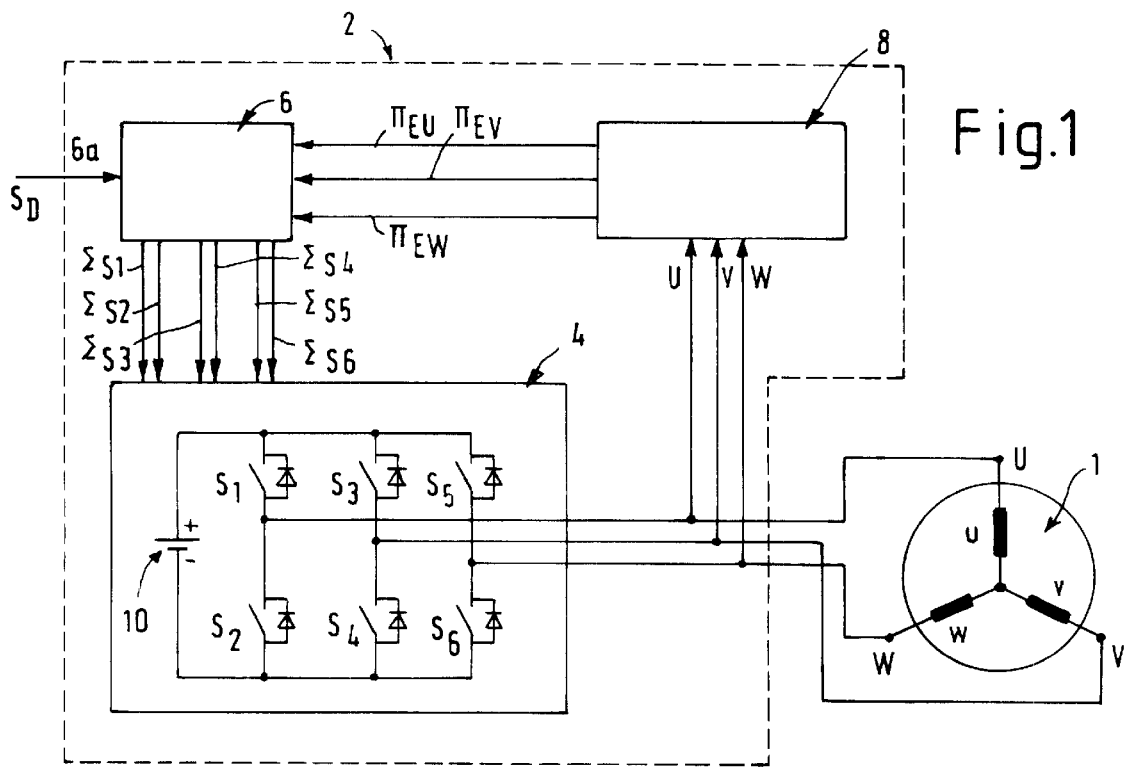

It is the object of the present invention to achieve a reduction of running and commutation noises whilst maintaining the inexpensive and fault-insensitive sensorless rotor position detection.

For this purpose, the control unit (6) drives the power semiconductors ($S_1$ to $S_6$) in twelve switching states, which are different with respect to the magnetic field direction effected in each case, by means of a 12-step commutation over one electrical revolution of the DC motor in dependence on the rotor positions.

15 Claims, 5 Drawing Sheets

SYSTEM FOR THE ELECTRONIC COMMUTATION OF A BRUSHLESS DC MOTOR

The present invention relates to a system for the electronic commutation of a brushless DC motor having three phase windings which are electrically displaced by 120°, comprising a semiconductor bridge of six power semiconductors, which drives the phase windings for generating a rotating magnetic stator field, a control unit which correspondingly drives the power semiconductors, and a device for detecting the respective rotational positions of a rotor exhibiting a permanent-magnetic magnet wheel, the device for detecting the rotor position being constructed as sensor-less evaluating unit, in such a manner that the voltage induced by the rotating magnet wheel, which can be measured in each case at the phase winding terminal which is currently not driven, is detected and evaluated.

For the electronic commutation of collector-less DC motors, the control unit driving the semiconductor bridge must, in principle, be supplied with information on the current rotational position of the permanent-magnetic rotor relative to the stator so that the respective suitable phase windings can be driven for generating a torque in the desired direction of rotation to generate by this means an optimum rotating stator field. In general, the rotor position is detected by rotor position sensors, especially Hall sensors by means of the permanent-magnetic rotor field. In many cases, however, the motor and its associated commutation electronics must be spatially separated from one another so that electrical connecting lines are required via which, on the one hand, current is supplied to the phase windings, and on the other hand, the signals of the rotor position sensors are transmitted to the control electronics. The connecting lines and the necessary connections, e.g. plug-in connections, however, lead to very high cost expenditure, especially for production (assembly) and material and in addition also increase the susceptibility to faults.

In contrast, a sensor-less detection of the rotor positions is provided in systems of the generic type as a result of which (Hall) sensors and corresponding separate line connections can be omitted. Instead, the polarities or polarity changes (zero transitions) of the voltages induced in the motor windings by the permanent-magnetic rotor field (internal voltage or, respectively, EMF=electromotive force) are detected via the respective non-driven currentless winding terminal and evaluated.

Such a sensorless commutation system is known, for example, from EP 0 881 761 A1. In this arrangement, the voltages at the three motor winding terminals are detected by an EMF detector circuit, and from this three corresponding binary output signals are generated for the sensorless rotor position determination. In this manner, six different combinations of these output signals are generated over one electrical revolution of the rotor which makes it possible to determine the rotor position in 60° segments. Each combination or each rotor position segment, respectively, is associated with one switching state of the bridge semiconductors (one semiconductor being pulsed in a pulse-width modulated manner for setting the speed in the respective switching state). As a result, there are six different switching states at 60° intervals over one electrical rotation. In this arrangement, the stator excitation (stator field) is commutated in six steps within one electrical rotation so that this is a 6-step commutation.

Similar commutation circuits with 6-step commutation are also described in documents EP 0 872 948 A1, DE 39 34 139 C2, DE 33 06 642 C2 and DE 36 02 227 A1.

In U.S. Pat. No. 5,491,393, a commutation control for brushless DC motors is described, this also being a 6-step commutation in principle because one electrical rotation of the motor is divided into six basic steps with respect to the changing direction of stator excitation. Although each of these basic steps is subdivided into two sections, but between these there is only one change of the power semiconductor which is in each case pulsed in a pulse-width modulated manner. In each step, however, only two of the six semiconductor switching elements of the power bridge circuit are in each case active so that it is always only two of three winding terminals which are actively connected to the positive or negative terminal of the DC source via the switching elements. For this reason, there can be only six different directions of stator excitation so that this is clearly a 6-step commutation in the proper sense.

A prior art which is very similar to U.S. Pat. No. 5,491,393 is also disclosed in U.S. Pat. No. 5,835,992, according to which six times two switching states or switch combinations are also provided but there, too, the direction of the stator excitation is changed in only six steps (=6-step commutation).

The present invention is based on the object of creating a system of the generic type initially described, by means of which a reduction in running and commutation noises is achieved whilst maintaining the inexpensive and fault-insensitive sensorless rotor position detection.

According to the invention, this is achieved by the fact that the control unit drives the power semiconductors in twelve different switching states by means of a 12-step commutation beyond one electrical revolution of the DC motor in dependence on the rotor positions. This 12-step commutation according to the invention is effected in such a manner that each of these twelve switching states causes a different excitation state of the stator relating to the direction of the magnetic field generated in it. For this purpose, it is provided that, on the one hand, switching states in which two power semiconductors of the semiconductor bridge are driven and, on the other hand, switching states in which three power semiconductors are driven, continuously occur in an alternating manner. In contrast, the power semiconductors in a 6-step commutation are driven in switching states which exclusively lead to six different excitation states of the stator. In the 12-step commutation, the stator excitation is in each case commutated by smaller angular steps than in a 6-step commutation as a result of which a continuously circulating stator field is generated.

The invention is initially based on the finding that the application of a 6-step commutation leads to motor noises, the "commutation clicking", due to an abrupt change in the stator excitation during the commutation time. When the electric motor is used as drive unit for a ventilator or a blower, these commutation noises are very pronounced and disturbing, especially in the lower speed range in which the flow noises recede, and cannot, therefore, be accepted in many applications. According to the invention, by comparison, a clear reduction of these noises can be achieved (especially in motors with an external rotor) in that, instead of only six switching states, twice the number of switching states of the power semiconductors of the semiconductor bridge are now provided per electrical revolution, i.e. the stator excitation is commutated in twelve steps instead of six steps within an electrical angle of rotation of 360°.

Although such a 12-step commutation is known per se, this is, however, exclusively with separate sensors for detecting the rotor position. The reason for this is that, among experts, it has hitherto always been assumed that sensorless construction of a 12-step commutation is not possible because sensorless rotor position detection always presupposes that in each case one winding terminal is currentless, that is to say isolated from the DC source in order to be able to detect induced internal voltage (EMF) at all with a sensorless evaluating unit. In distinction from the 6-step commutation, however, this is not generally so with 12-step commutation because there are areas of winding current overlaps in which all three winding terminals carry current.

Thus, the present invention is based on the further finding that 12-step commutation is only possible if care has been taken that polarity changes or zero-transitions of the internal voltage occur precisely in those intervals—severely shortened in the case of 12-step commutation—in which the corresponding winding terminal is in each case isolated from the DC source and can therefore be used for detecting the control-related magnitudes.

In real terms this is preferably achieved by the fact that EMF evaluating unit in each case detects and evaluates the internal voltage between a motor winding terminal and a common reference point. The reference point can here be either the actual neutral point of the motor, brought out via a line, if the motor windings are connected in a star connection, or an equivalent neutral point. It should be noted in this respect that, of course, a motor delta connection can also be fictitiously transferred into a star connection. According to the invention, the EMF evaluating unit accordingly, in practice, detects the respective phase voltage or "phase EMF" in the star system instead of the phase-to-phase "conductor EMF" which can be measured between two winding terminals and which, by comparison, is phase-shifted by 30°. It is due to this measure, according to the invention, that zero transitions of the internal voltage can be detected at all because they fall precisely into the steps in which a winding terminal is in each case currently currentless over a short range of 30°. In contrast, detection and evaluation of the voltage which is in each case between two motor winding terminals would not be suitable for 12-step commutation because, in this arrangement, the zero transitions of the induced internal voltage would always occur when all three winding terminals are carrying current, i.e. are connected to the DC source so that detection would not be possible at all.

Figure 2:
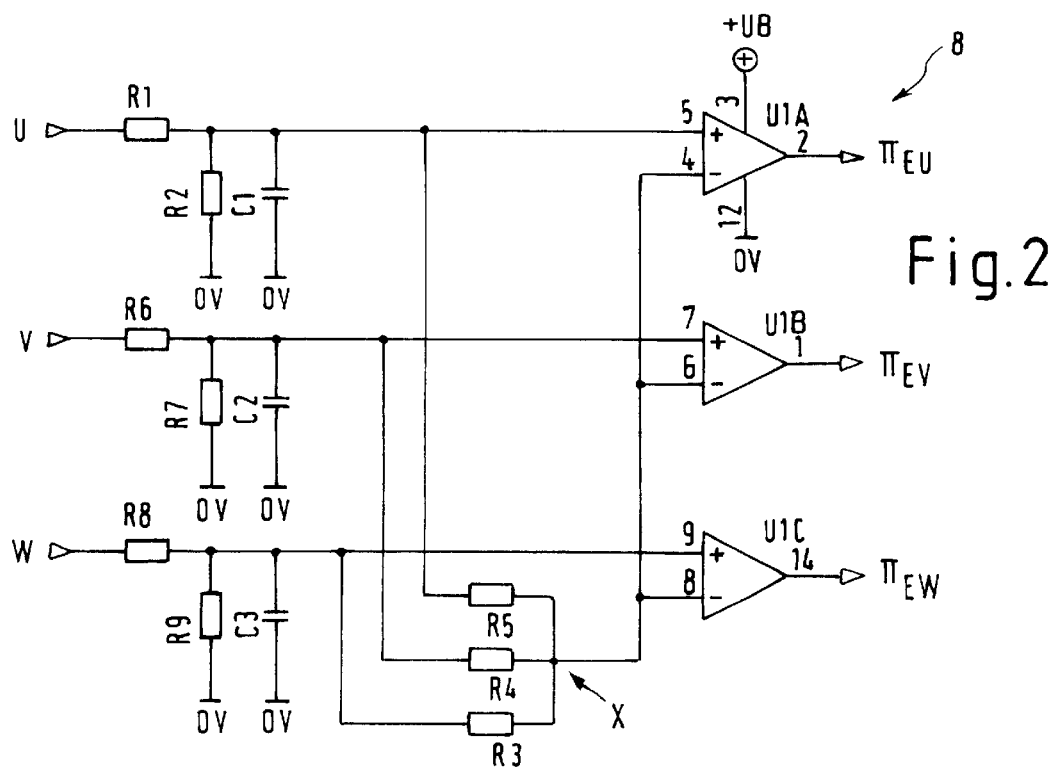
Figure 3:
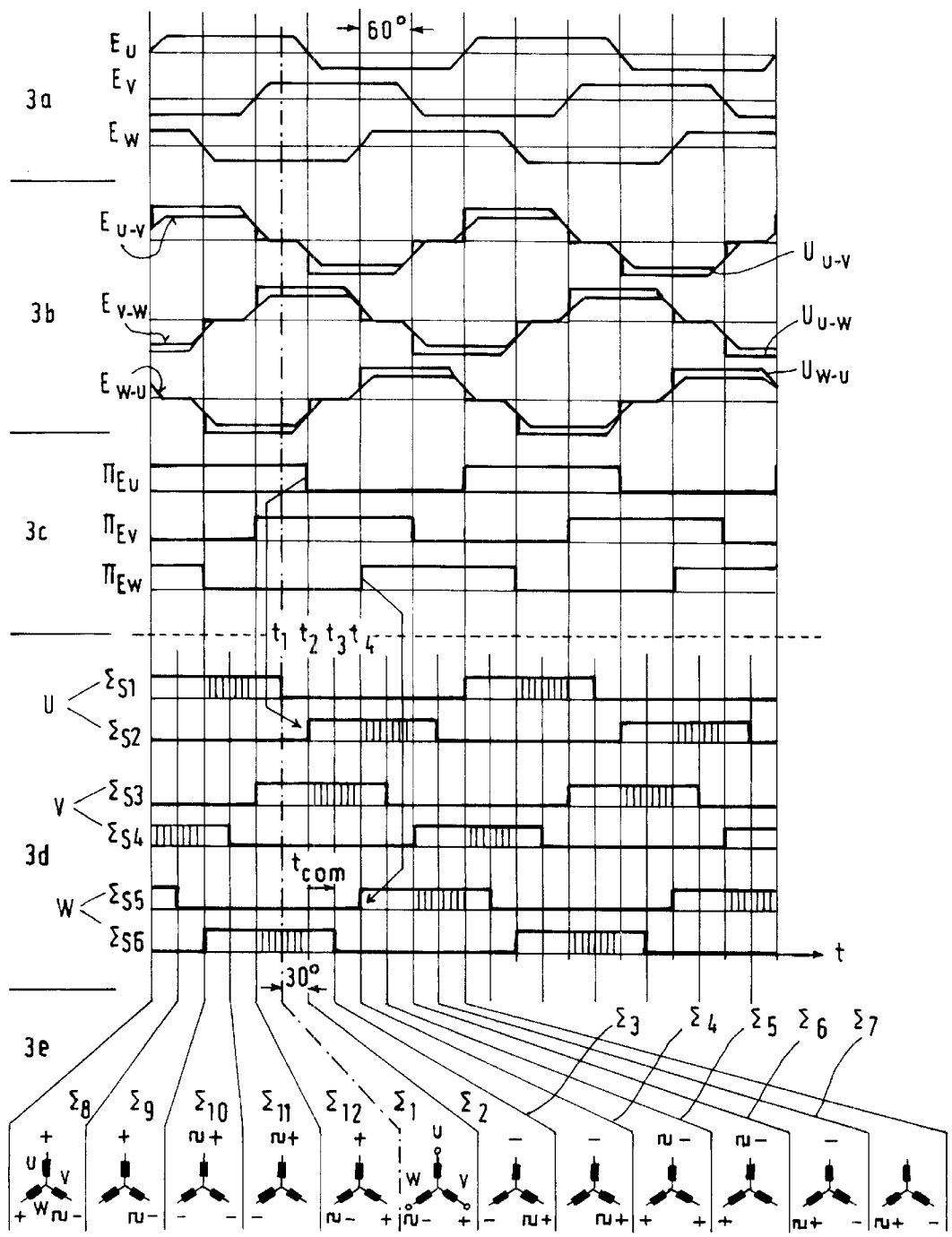
Figure 4:
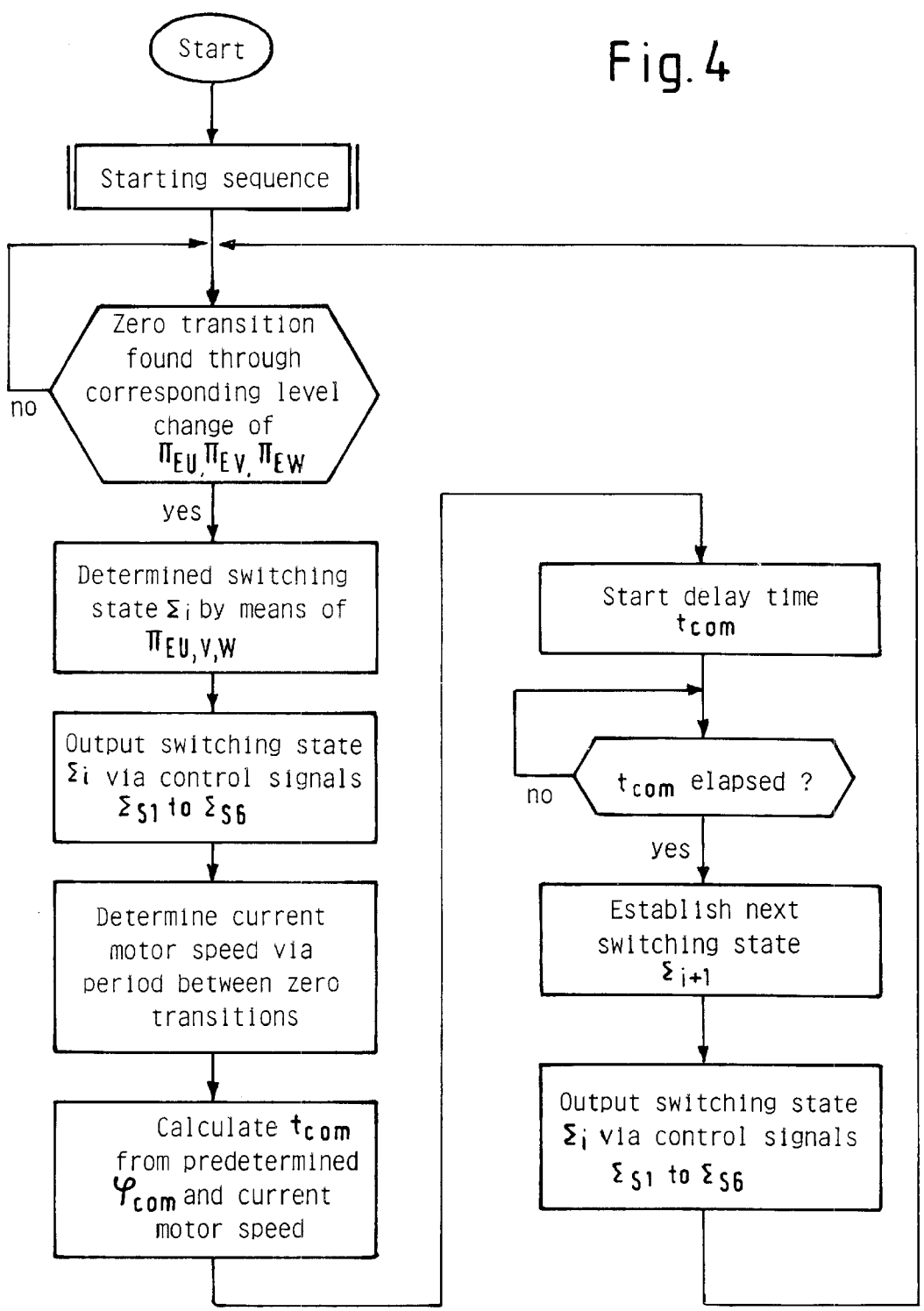
Figure 5:
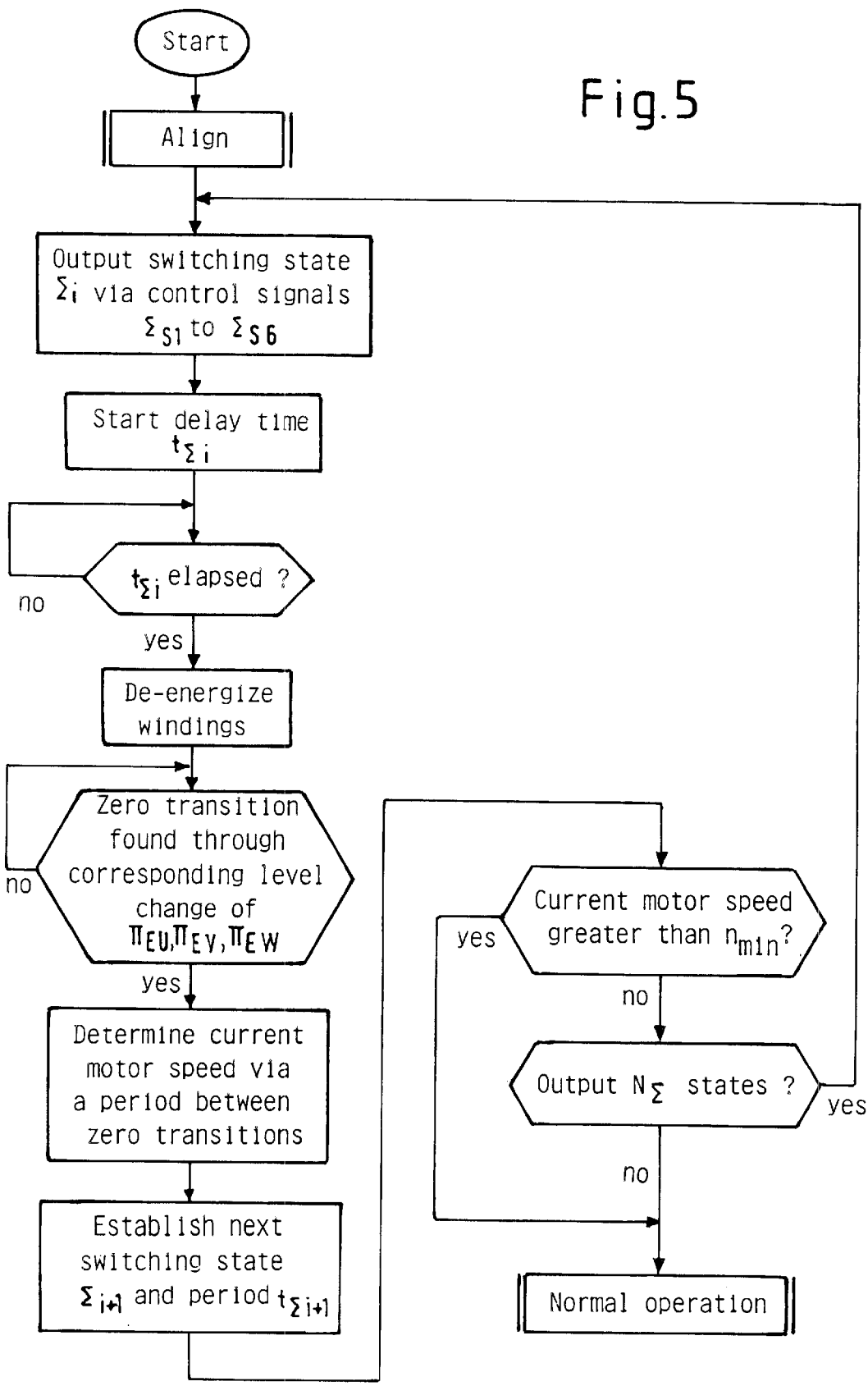
Figure 6:
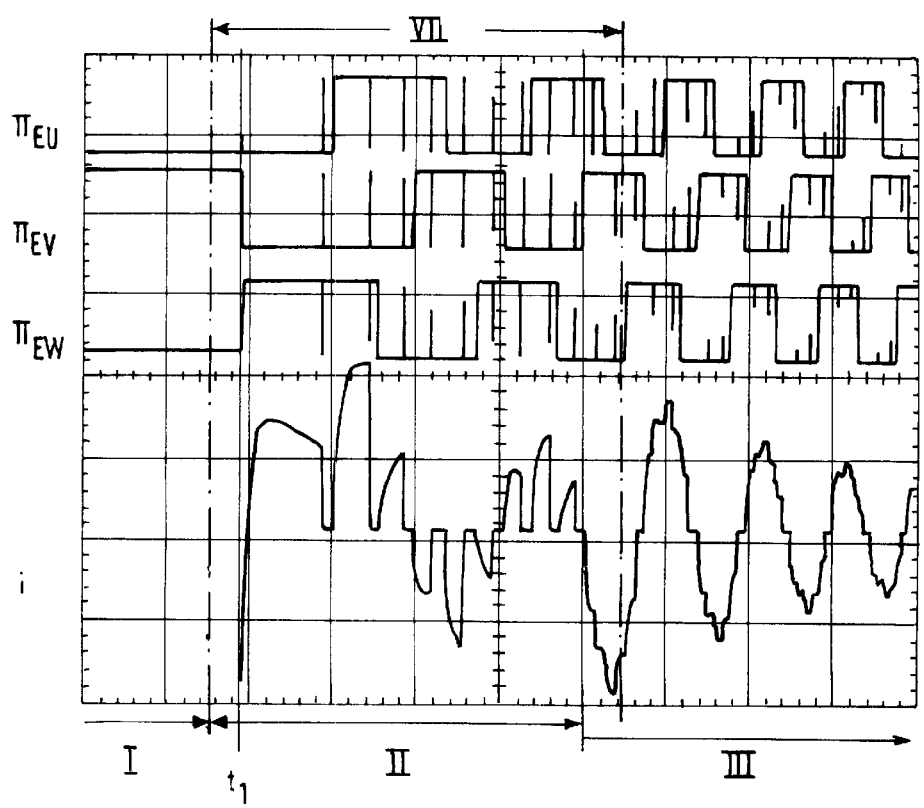
Figure 7:
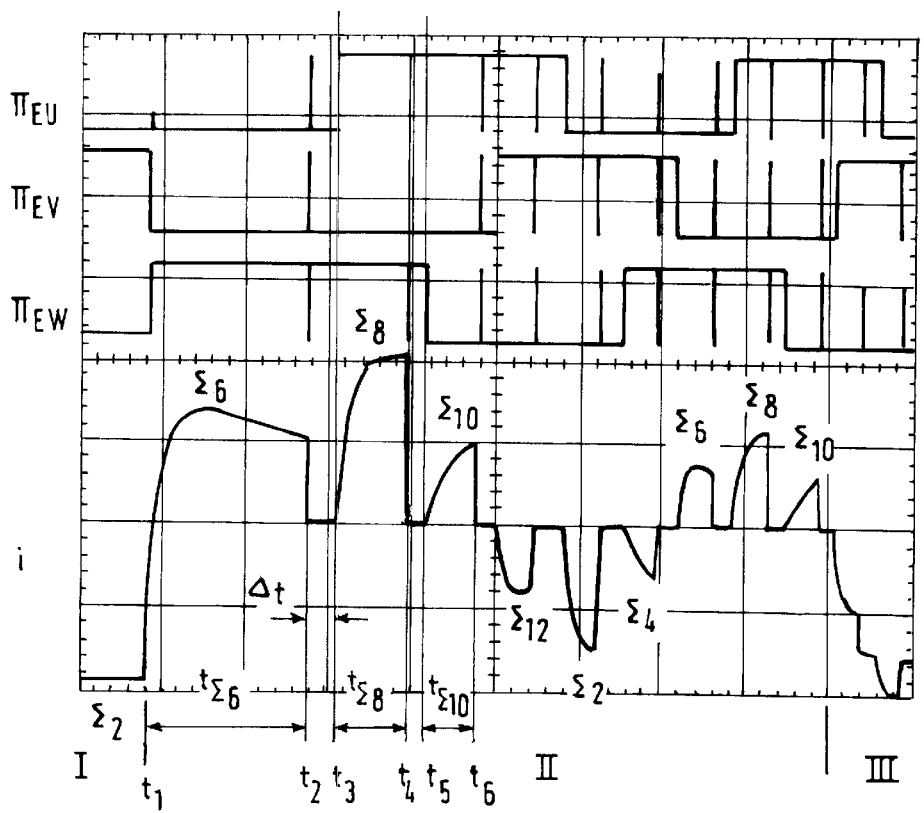

The invention will now be explained in greater detail by way of an example and with reference to the drawing, in which:

FIG. 1 shows a basic circuit diagram of a commutation system according to the invention, FIG. 2 shows a circuit diagram of a preferred embodiment of an EMF evaluating unit, FIG. 3 shows different diagrams for explaining the sequences when using the commutation system according to the invention, FIG. 4 shows a flowchart of the control sequence for the commutation system according to the invention, FIG. 5 shows a corresponding flowchart especially for the starting process, FIG. 6 shows diagrams for start and normal operation, and FIG. 7 shows an enlarged representation of time domain VII in FIG. 6.

As can be seen firstly from FIG. 1, a 3-phase DC motor 1 is driven by a commutation system according to the invention (commutation electronics) 2. Of the motor 1, only a stator having three phase windings u, v, w which are electrically displaced by in each case 120°, is indicated; an associated permanent-magnetic rotor (magnet wheel) is not shown. In the example shown, the phase windings u, v, w are connected in star connection but, according to the invention, a delta connection is also easily possible. The phase windings u, v, w are connected via the phase terminals U, V, W to a power section constructed as semiconductor bridge 4. The semiconductor bridge 4 consists of six power semiconductors $S_1$ to $S_6$ which, in turn, are driven by a control unit 6 via control signals $\Sigma_{S1}$ to $\Sigma_{S6}$ in dependence on the respective rotational positions of the rotor. To detect the rotor positions, an EMF evaluating unit 8 is provided which is connected to the phase winding terminals U, V and W in order to detect the EMF induced in each case in the phase windings u, v, w by the rotating rotor or, respectively, the "internal voltage", and to evaluate it with respect to its polarities or zero transitions, respectively. In dependence on this, the EMF evaluating unit 8 generates corresponding output signals $\pi_{EU}$, $\pi_{EV}$ and $\pi_{EW}$ for the control unit 6. To generate a rotating magnetic stator field, the control unit 6 drives the power semiconductors $S_1$ to $S_6$ in each case cyclically alternating combinations in that the winding terminals U, V, W are either connected to the positive or the negative terminal of a DC source 10 or are isolated from the voltage source 10 in a high-impedance manner. High-efficiency operation of the motor 1 is achieved—neglecting the electrical time constant of the motor phase windings, if the EMF which can be detected between the winding terminals U, V, W has the same variation and the same phase angle as the voltage provided at these terminals by the semiconductor bridge 4. To achieve the appropriate drive, the control unit 6 is supplied with the output signals $\pi_{EU}$, $\pi_{EV}$, and $\pi_{EW}$ of the EMF evaluating unit 8 which correspond to the polarity of the EMF induced in the phase windings u, v, w of the motor 1 and, respectively, reflect the current position of the motor. In addition, the control unit 6 has a control input 6a via which a speed adjustment signal $S_D$ for influencing the motor speed can be supplied.

In the phases in which two of the three phase windings are connected to the feeding DC source 10 but the third winding terminal is isolated from the voltage source 10 in a high-impedance manner, the latter can be used for detecting the EMF induced in this phase winding (internal voltage). The EMF evaluating unit 8 detects the respective polarity of the phase EMF and generates from this the three binary output signals $\pi_{EU}$, $\pi_{EV}$, and $\pi_{SW}$ which in each case are allocated to one phase winding, and which, for example, supply a logical 1 signal with a positive voltage across the corresponding phase winding and a logical 0 signal with a negative phase voltage. As a result, six different output combinations, which can be unambiguously associated with a particular rotor position (in 60° segments) are obtained over one electrical revolution of the motor 1—in principle—analogously to a method involving sensors with Hall sensor circuits arranged in the motor.

FIG. 3 diagrammatically shows at 3a the voltages (EMFs) $E_U$, $E_V$ and $E_W$ induced by the rotating magnet wheel in the individual phase windings. Diagram 3b shows the corresponding voltages $E_{U-V}$, $E_{V-W}$ and $E_{W-U}$ which will be detected in each case between two winding terminals. In addition, Diagram 3b shows the real superimposed variation of the voltages $U_{U-V}$, $U_{V-W}$, and $U_{W-U}$ applied to the winding terminals and of the induced voltages. Diagram 3c shows the output signals $\pi_{EU}$, $\pi_{EV}$ and $\pi_{EW}$ of the EMF evaluating unit 8 in an idealized manner and as an example of the star-connected motor.

Although the states of the output signals shown in FIG. 3c in each case change every 60° el, it is provided, according to the invention, that the control unit 6 drives the power semiconductors $S_1$ to $S_6$ of the semiconductor bridge 4 by means of a 12-step commutation, i.e. in twelve different switching states, beyond one electrical revolution in dependence on the output signals according to FIG. 3c. In this arrangement, states in which two of the six power semiconductors are driven, on the one hand, and, on the other hand, those in which three of the six power semiconductors are driven, alternate. In the switching states with two active power semiconductors, two of the three winding terminals (U, V, W) are connected to the DC source 10 and in those with three active power semiconductors, all winding terminals are connected to the DC source. Each of these switching states leads to a different state of excitation of the stator as far as the direction of the magnetic field generated in it is concerned. In a preferred embodiment, one of the power semiconductors is pulsed preferably in a pulse-width modulated manner, for setting the speed in each of these switching states.

Since a 12-step commutation will necessarily result in phases in which temporarily all three winding terminals are at a defined potential and, as a result, no open winding terminal is available for detecting the EMF, care is taken according to the invention, to see that the zero transitions of the EMFs which are relevant to the control fall into the intervals in which in each case one winding terminal is isolated from the DC source.

According to FIG. 2, this is achieved by a special type of EMF evaluating unit a which is designed in such a manner that it in each case detects and evaluates the internal voltage (EMF) between a motor winding terminal U, V, W and a common reference point X. In the circuit example shown in FIG. 2, the reference point X is a resistively simulated neutral point of the motor. The voltages picked up across winding terminals U, V, W are compared with the potential present at reference point X by means of comparators U1A, U1B and U1C, respectively, at the outputs of which the binary output signals $\pi_{EU}$, $\pi_{EV}$ and $\pi_{EW}$ are generated.

As can also be seen from FIG. 3, the control unit 6 derives the drive signals $\Sigma_{S1}$ to $\Sigma_{S6}$ for the semiconductor bridge 4 from the output signals $\pi_{EU}$, $\pi_{EV}$ and $\pi_{EW}$ of the EMF evaluating unit 8. This relationship can be seen in Diagrams 3c and 3d and supplementary 3e; 3d illustrating the individual drive signals for the power semiconductors and 3e showing the phase windings of the motor in the respective associated excitation states. The twelve different switching states $\Sigma_1$ to $\Sigma_{12}$ of the power semiconductors according to FIG. 3d produce 12 different excitation states of the stator (FIG. 3e) with respect to the voltages applied to the winding terminals of the motor which lead to the magnetic stator field being built up in twelve different successive directions. The principle of operation in normal operation will now be explained starting with the state $\Sigma_1$.

In state $\Sigma_1$, switches $S_3$ and $S_6$ are active. $S_3$ is conducting continuously, $S_6$ is preferably pulsed in a pulse-width-modulated manner for setting the speed which is indicated by the part of $\Sigma_{S6}$ signal drawn shaded. Since only two semiconductor switches are conducting, detection of the EMF is possible in phase winding u, through which no current is flowing at the moment, i.e. at the winding terminal U not connected to the DC source 10. Due to the rotation of the rotor, the EMF changes its polarity at time $t_2$ in this phase winding which results in a level change of the $\pi_{EU}$ signal. This edge triggers switching state $\Sigma_2$ which, according to the 12-step commutation is placed between two states of the conventional 6-step commutation for reducing the commutation noise and the running noises of the motor. In this state, power semiconductors $S_2$, $S_3$ and $S_6$ are conducting, i.e. all winding terminals are connected to the DC source 10 which is why detection of the EMF is no longer possible. For this reason, a commutation time $t_{com}$ is calculated from the current speed of the rotor and a predetermined angle of rotation $\phi_{com}$. This time $t_{com}$ begins at time $t_2$ and ends at time $t_3$ of the transition to the next switching state $\Sigma_3$, in which $S_6$ is switched off. The winding terminal W is no longer connected to the DC source 10 which makes it possible to detect the EMF in phase w. This sequence is repeated correspondingly with the next level change of the $\pi_{EW}$ signal at time $t_4$ as can be seen from FIG. 3d.

In FIG. 4, this control sequence described is shown more generally in the form of a flowchart. Further explanations are not necessary due to the text components contained in FIG. 4.

According to FIG. 3, the following regular features exist, according to the invention, with the pulse-width modulation, provided in a preferred manner, for changing the effective winding voltage, i.e. for influencing the speed:

a) During each commutation step, one power semiconductor, at a maximum, is pulsed in a pulse-width modulated manner.

b) Each semiconductor is pulsed, in a pulse-width modulated manner for a coherent electrical angle of 60°.

c) During a change from an even-numbered state ($\Sigma_2$, $\Sigma_4$ ...), in which in each case three semiconductors are active, to an odd-numbered state ($\Sigma_1$, $\Sigma_3$ ...) having in each case two active semiconductors, the semiconductor pulsed in a pulse-width-modulated manner does not change. During the change from an odd-numbered state to an even-numbered state, the semiconductor pulsed in a pulse-width-modulated manner changes.

d) The control factor of the semiconductor pulsed in a pulse-width-modulated manner is preferably different for even-numbered and odd-numbered states, and, in particular, smaller with even-numbered states than with odd-numbered states.

As has already been explained, the sensorless 12-step commutation is possible because, in the commutation sequence according to the invention, in connection with the special EMF evaluating unit 8, for example according to FIG. 2, the EMF always changes polarity in a winding at a time in which the corresponding winding terminal is open and, as a result, is available for detecting and evaluating the voltage induced by the magnet wheel.

In reality, the electrical time constant of the motor winding is not zero. As a result, there is a frequency- or speed-dependent phase shift between the winding current and the alternating voltage present across the windings as a result of which the motor efficiency drops. To compensate for this, the commutation should occur at an earlier time with increasing speed.

According to the invention, this is done via the angle $\phi_{com}$, which is adapted to the current speed of the motor for the odd-numbered states $\Sigma_1$, $\Sigma_3$, $\Sigma_5$, $\Sigma_7$, $\Sigma_9$ and $\Sigma_{11}$. $\phi_{com}$ becomes smaller with increasing speed as a result of this the commutation is performed earlier. Such pre-firing is not possible in the case of the even-numbered states $\Sigma_2$, $\Sigma_4$, $\Sigma_4$, $\Sigma_6$, $\Sigma_8$, $\Sigma_{10}$ and $\Sigma_{12}$ since otherwise the polarity change of the EMF could no longer be detected.

In an advantageous embodiment of the invention, the angle $\phi_{com}$ is adapted with respect to the required motor performance in dependence on the speed. In general, the highest possible efficiency is demanded as a result of which the angle $\phi_{com}$ is changed degressively with the speed. The even-numbered states $\Sigma_2$, $\Sigma_4$, to $\Sigma_{12}$, in contrast, are provided at the same time as the EMF polarity changes.

In another advantageous variant, the even-numbered states are replaced by the previously existing odd-numbered states from a fixed speed $n_{lim}$ of the motor. If the speed is less that $n_{lim}$, the sequence $\Sigma_1$, $\Sigma_2$, $\Sigma_3$, ... $\Sigma_{11}$, $\Sigma_{12}$, $\Sigma_1$ is predetermined by the control unit 6. If, in contrast, the speed is higher, the sequence is ... $\Sigma_1$, $\Sigma_1$, $\Sigma_3$, $\Sigma_3$, ... $\Sigma_{11}$, $\Sigma_{11}$, $\Sigma_1$ .... Naturally, this correspondingly also applies in the reverse order to the other direction of rotation of the motor.

Previously, it has been assumed that the motor is rotating (normal operation). When the motor is standing still, however, no EMF is (yet) induced in the windings as a result of which there is no information on the position of the rotor. A special method is therefore preferably used for the sensorless start. In this method, the 12-step commutation can be advantageously also used for the starting process of the motor. In particular, the intermediate steps additionally inserted in the 12-step commutation compared with the 6-step commutation are used in this case.

According to the prior art, after the rotor has been aligned in a defined position by applying direct current to the windings, a sequence of steps is provided for starting the motor without taking into consideration the signals of the EMF evaluating unit ("open loop") until a speed has been achieved which is sufficiently high, i.e. the amplitude of the EMF is high enough for detecting its polarity. This sequence of steps is specified for a particular mechanical time constant of the drive system. Difficulties arise with changing load conditions or different moments of inertia. It may occur in this case that the rotor cannot follow the sequence of steps and, therefore, will not start.

For cost reasons, a "bootstrap circuit" is frequently used for driving the (odd-numbered) power semiconductors $S_1$, $S_3$, $S_5$, the "upper ones" according to FIG. 1, for supplying voltage to the associated driver stages. However, this circuit principle has the disadvantage that the "upper" semiconductor switch cannot be switched on for an arbitrary length of time, or a bridge branch cannot be inactive for an arbitrary length of time since otherwise the voltage across the bootstrap capacitor can drop to an inadequate value. When motors are slow to start, there may be difficulties in the drive.

A preferred starting method according to the invention is intended to eliminate the said disadvantages.

This preferred starting method is based on the finding that the EMF can be reliably detected even at relatively low speeds as long as all windings are de-energized. When current is flowing, higher speeds, i.e. greater amplitudes of the EMF, are required for being able to reliably evaluate the EMF due to, among other things, the interference due to the switching processes in the case of pulse-width-modulation.

FIG. 6 and the enlarged section in FIG. 7 in each case show the output signals $\pi_{EU}$, $\pi_{EV}$ and $\pi_{EW}$ of the EMF evaluating unit 8 and the current variation i in one of the motor feed lines. The start-up process from standstill consists of the operating phases I alignment, II starting sequence and III normal operation. For the alignment in phase I, a direct current is fed into all phase windings. The rotor then aligns itself to a predetermined position. Starting from the unambiguous rotor position which is now known, current is applied to the motor windings in a suitable manner until a sufficiently high speed is reached. Then commutation takes place in accordance with the principle already described above. The special start-up sequence II will be explained in greater detail with reference to FIG. 7 in the text which follows.

After the rotor has been aligned, e.g. in that the switching state $\Sigma_2$ is output by the control unit 6 via the control signals $\Sigma_{S1}$ to $\Sigma_{S6}$ (compare FIG. 3), state $\Sigma_6$ is provided at a time $t_1$ which results in a commutation of the stator field as a result of which the rotor accelerates into a desired direction of rotation. This state is maintained for the period $t_{\Sigma 6}$ until all semiconductors of the semiconductor bridge 4 are switched off at time $t_2$. As a result, the phase windings become de-energized as a result of which a reliable detection of the change in polarity of the EMF in phase u becomes possible at time $t_3$, inspite of the still relatively low speed, which is signalled by the rising edge of the signal $\pi_{EU}$. After that, the subsequent state $\Sigma_8$ is activated for period $t_{\Sigma 8}$. The winding, which has become de-energized after the switch-off at time $t_4$, allows a reliable detection of the change in polarity of the EMF in phase w signalled by the falling edge of signal $\pi_{EU}$ at time $t_5$. This edge initiates the state $\Sigma_{10}$. This sequence is correspondingly repeated until either a fixed number of states $N_\Sigma$ has been output or a fixed speed $n_{min}$ has been exceeded. If this is so, transition to normal operation, i.e. the application of the abovementioned principle of 12-step commutation takes place.

FIG. 5 additionally shows the sequence of the basic principle of the starting process described in the general form of a flowchart.

The method described has the decisive advantage that it is a closed loop, i.e. the variation of the EMF is always included in the control sequence from the first acceleration phase after the alignment of the rotor. In comparison with an open-loop starting sequence, in which detection of the EMF is not possible, at the beginning due to the continuous excitation of the winding, a much better start-up characteristic is achieved according to the invention. Even if the motor has to start under a greater load, commutation always takes place at the correct time since the EMF is also included.

According to the invention, the states predetermined during starting sequence II ($\Sigma_2$, $\Sigma_6$, $\Sigma_8$, $\Sigma_{10}$ ... in the example) are exclusively the commutation steps inserted for achieving 12-step commutation, in which all three Winding terminals are connected to the DC source 10, i.e. in each case three power semiconductors are always active. To limit the winding current, the "upper" (odd-numbered) power semiconductors of the semiconductor bridge 4 according to FIG. 1 are pulsed in a pulse-width-modulated manner. This method has the advantage that the charge of the bootstrap capacitors is retained which is not always the case in solutions according to the prior art since here a winding terminal can be open for a prolonged period during the start-up and the bootstrap capacitor belonging to the relevant branch of the semiconductor bridge can become discharged. An advantage of no lesser importance lies in the fact that the beginning of the states predetermined during the starting sequence II according to the invention coincides with the change in polarity of the EMF as a result of which a displacement by $\phi_{com}$ can be omitted in contrast with the prior art. During the start, there is no reliable information on the speed of the motor which is why a calculation of the required delay time $t_{com}$ from $\phi_{com}$ would be critical.

The times $t_{\Sigma 6}$, $t_{\Sigma 8}$, $t_{\Sigma 10}$, ... according to FIG. 7 depend on the lowest mechanical load and the smallest possible moment of inertia of the rotating parts and can be calculated in a simple manner from the motion equation or be determined empirically.

In a further advantageous embodiment of this method, the period $\Delta t$ (compare again FIG. 7) after the turn-off of the semiconductor switches of the bridge 4, is e.g. at time $t_2$, up to the detection of the change in polarity of the EMF in phase winding u at time $t_3$, measured by the control unit 6. $\Delta t$ is used as a measure of how quickly the motor is accelerating, i.e. what the mechanical system time constant is. Depending on the measured time $\Delta t_i$ after the state $\Sigma_i$, the period of the subsequent state $t_{\Sigma_{i+1}}$ is adapted in such a manner that maximum acceleration is achieved. If $\Delta t_i$ is large, the period $t_{\Sigma_{i+1}}$ increases and conversely.

A possible implementation of this principle can look as follows. At a fixed starting sequence consisting of successive states (e.g. $\Sigma_2, \Sigma_6, \Sigma_8, \Sigma_{10}, \ldots$), the associated times $t_{\Sigma_2}, t_{\Sigma_6}, t_{\Sigma_8}, t_{\Sigma_{10}}, \ldots$ for various mechanical system time constants are calculated from the motion equation or empirically determined and stored in the control unit 6. After each step of the starting sequence, $\Delta t$ is checked to see how far the predetermined period deviates from the optimum one and the appropriate period for the subsequent state is thus selected from the stored times. The method thus automatically adapts to the mechanical system time constant within certain limits. As a result of this adaptive method, a good starting characteristic is achieved within a wide range of different load cases and different moments of inertia.

A self-learning method which adapts to the respective connected motor during the starting sequence if, for example, the same electronics are to be operated with different motors, represents a further improvement of this principle. However, the prerequisite for such a method is that the load conditions and moments of inertia of the system do not significantly change from start to start which can be generally assumed, e.g. in the field of ventilation. For the start, a predetermined starting sequence as already described above is again provided. During the start, the times $\Delta t_i$ are continuously detected and the associated times $t_{\Sigma_i}$ are varied by the correction values $\Delta t_{\Sigma_i}$ in such a manner that $\Delta t_i$ will tend towards zero during the next start-up of the motor. The correction values $\Delta t_{\Sigma_i}$ are permanently stored in the control unit 6, for example in an EEPROM. With this method, the starting characteristic of the motor improves with each start. After a few start-ups, the optimum start-up for the given load case or, respectively, the given moment of inertia is finally reached and is immediately available for future start-up processes. Creeping changes in the load case or moment of inertia in the system are advantageously also compensated for by this procedure as a result of which a uniformly optimized start-up always becomes possible.

The control functions described by way of example in the previous text and forming the basis of the invention are implemented in the form of combinatorial and sequential logic in the control unit 6, preferably by means of a microprocessor, microcontroller or a programmable integrated logic circuit.

Finally, the essential advantages of the invention compared with the prior art are summarized again as follows.

Inexpensive, sensorless and advantageous method from the point of view of noise for commutating a three-phase permanently excited motor in delta or star connection.

Due to the 12-step commutation, the motor currents have close to a sinusoidal shape. The resultant noise improvements are very significant, especially in the case of motors with external rotor. Due to its restricted dynamic range as a result of the large mass inertia of the external rotor, an external rotor motor is particularly suitable for the sensorless 12-step commutation according to the invention. The main reason for this is, according to the invention, the time $t_{com}$ must be calculated. These must be obtained from the period between the preceding zero transition information of the EMF evaluation. This is possible using simple means with sufficient accuracy especially if the motor speed does not change too fast. This makes the external rotor especially suitable.

Rugged method for the sensorless start by utilizing the intermediate states additionally inserted in the 12-step commutation, which are in phase with the changes in polarity of the EMF.

Measurement of the EMF during the starting process in the de-energized state of the windings which enables the EMF to be reliably evaluated even at relatively low speeds. As a result, a closed loop can also be used during the starting process, i.e. the information of the EMF evaluation can be included in the start-up sequence. This improves the starting characteristic and makes it more tolerant to changes in load and the moment of mass inertia.

Adaptive starting method by comparing the predetermined commutation time with the ideal commutation time by detecting the EMF in the de-energized state of the windings and adaptation of the subsequent commutation times to the mechanical system time constant.

The invention is not restricted to the exemplary embodiments shown and described, but also comprises all embodiments working in the same manner in the sense of the invention as set forth in the following claims.

What is claimed is:

1. System for the electronic commutation of a brushless DC motor (1) having three phase windings (u, v, w) which are electrically displaced by 120°, comprising a semiconductor bridge (4) consisting of six power semiconductors ($S_1$ to $S_6$), which drives the phase windings (u, v, w) for generating a rotating magnetic stator field, a control unit (6) which correspondingly drives the power semiconductors ($S_1$ to $S_6$), and a device for detecting the respective rotational position of a rotor exhibiting a permanent-magnetic magnet wheel, the device for detecting the rotor position being constructed as sensor-less evaluating unit (8), for evaluating the voltage induced by the rotating magnet wheel which can be measured at a winding terminal of the motor which is not currently driven, characterized in that, the control unit (6) drives the power semiconductors ($S_1$ to $S_6$) by means of a 12-step commutation in twelve different switching states over one electrical revolution of the DC motor (1) in dependence on the rotor positions; and in that, due to the twelve different switching states of the power semiconductors ($S_1$ to $S_6$) the stator field of the motor (1) is predetermined in twelve excitation states, which are different with respect to the direction of the magnetic field, via the windings (u, v, w), wherein the control unit is operative to drive the power semiconductors occurring in switching states with two driven power semiconductors, on the one hand, and on the other hand, switching states with three driven power semiconductors, whereby the evaluating unit can measure induced voltage at the winding which is not currently driven, in a continuously alternating manner.

2. System according to claim 1, characterized by an adaptive start-up commutation control, in which the commutation times are automatically adapted in dependence on the running characteristic, or, respectively, the mechanical time constant of the drive system.

3. System according to claim 1, characterized in that, the evaluating unit (8) in each case detects and evaluates the voltage between a motor winding terminal (U, V, W) and a common reference point (X).

4. System according to claim 3, characterized in that the common reference point (X) is established in such a manner that the measured voltages extend in phase to the voltages induced in the star-connected phase windings by the rotating magnet wheel or in phase with the fictitious phase voltages resulting when a delta connection is transformed into an equivalent star connection.

5. System according to claim 3, characterized in that the reference point (X) is directly derived from a real winding neutral of the motor.

6. System according to claim 3, characterized in that the reference point (X) is an external simulation of a winding neutral of the motor.

7. System according to claim 1, characterized in that the evaluating unit (8) is operative to detect zero transitions of the respectively induced internal voltages ($E_u$, $E_v$, $E_w$) with respect to their polarities, and generates, in dependence thereon, binary output signals ($\pi_{EU}$, $\pi_{EV}$, $\pi_{EW}$) as control input signals for the control unit (6).

8. System according to claim 1, characterized in that the control unit (6), for setting the speed of the motor (1), in each case drives one of the power semiconductors ($S_1$ to $S_6$) pulsed in a pulse-width-modulated manner in dependence on a speed setting signal ($S_D$) supplied by a control input (6a).

9. System according to claim 8, characterized in that in each state of revolution, only one of the power semiconductors ($S_1$ to $S_6$) at a maximum is pulsed in a pulse-width-modulated manner, in each case over a coherent electrical angle of 60°.

10. System according to claim 1, characterized by a speed-dependently changing commutation, the commutation taking place at least at each second commutation step, in each case earlier with increasing speed.

11. System according to claim 1, characterized in that in each case odd-numbered states ($\Sigma_1$, $\Sigma_3$ ... $\Sigma_{11}$), in which two winding terminals are energized and one winding terminal is open, on the one hand, and on the other hand, even-numbered states ($\Sigma_2$, $\Sigma_4$, ... $\Sigma_{12}$), in which all winding terminals (U, V and W) are energized, alternate over the electrical revolution, the length in time ($t_{com}$) of the even-numbered states being determined mathematically from respective speed and a predetermined commutation angle ($\phi_{com}$) for the commutation.

12. System according to claim 11, characterized in that the commutation angle ($\phi_{com}$) provided is degressively changed with speed for the speed-dependent commutation.

13. System according to claim 1, characterized in that, for starting the motor (1) from standstill, the rotor is first aligned into a defined rotational position by applying a constant direct current to the phase windings (u, v, w).

14. System according to claim 1, characterized in that commutation takes place by means of the rotor positions detected by the evaluating unit (8) even during the start-up of the motor (1).

15. System according to claim 14, characterized in that, during the start-up phase (II) of the motor (1), all phase windings (u, v, w) are temporarily de-energized by the control unit (6) for better detection of the induced voltage which is still weak due to the still relatively low speed.

* * * * *